C. E. LARRABEE.
DUPLEX COUNTER.
APPLICATION FILED JUNE 17, 1916.

1,263,571.

Patented Apr. 23, 1918.
5 SHEETS—SHEET 1.

INVENTOR
Clinton E. Larrabee
BY
Kerr, Page, Cooper & Hayward.
ATTORNEY

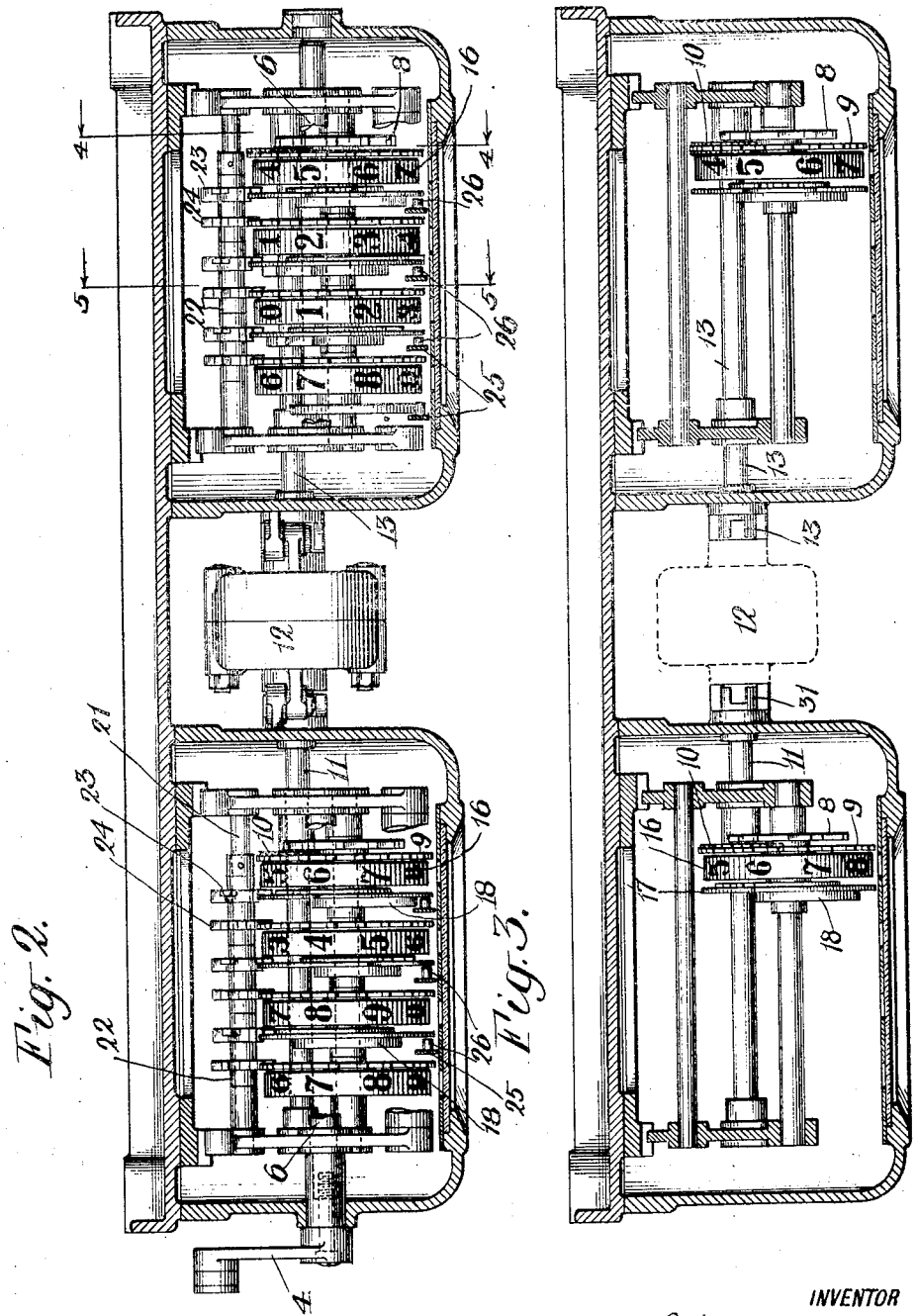

C. E. LARRABEE.
DUPLEX COUNTER.
APPLICATION FILED JUNE 17, 1916.
1,263,571.
Patented Apr. 23, 1918.
5 SHEETS—SHEET 3.
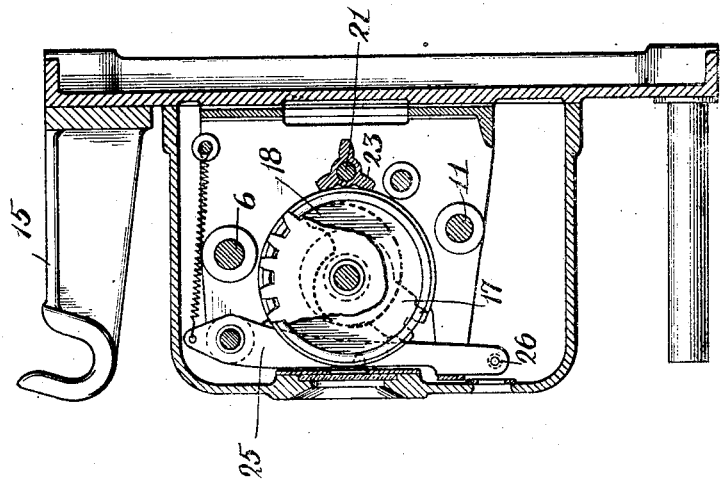
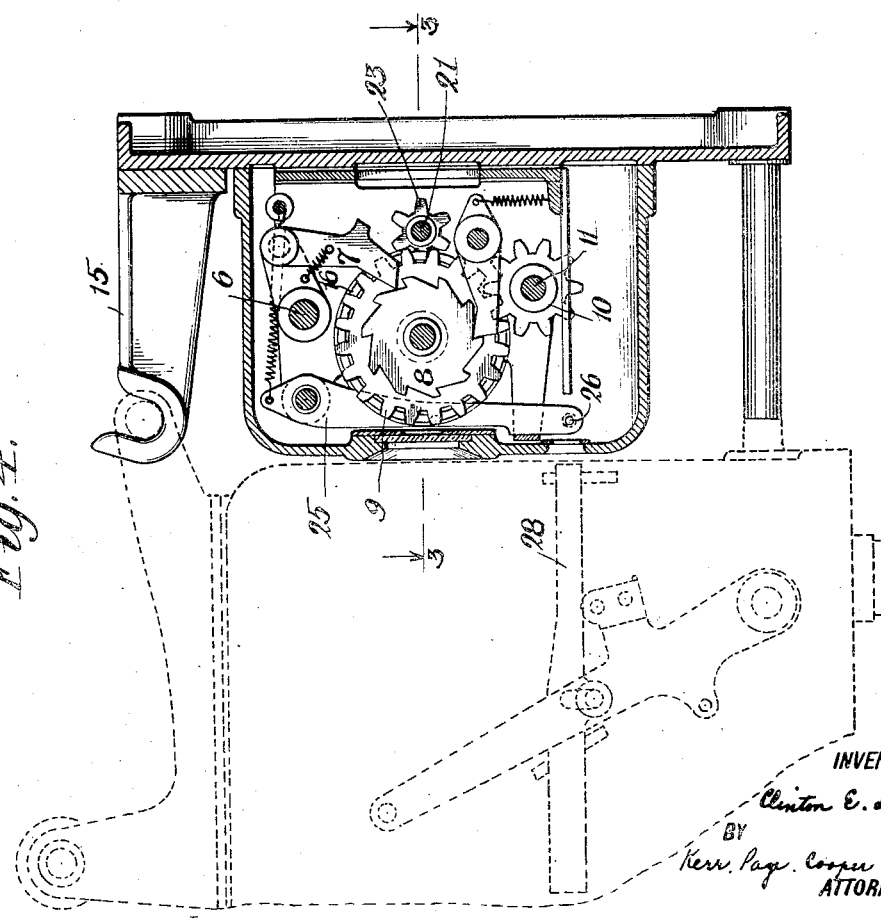
INVENTOR
Clinton E. Larrabee
BY
Kerr, Page, Cooper & Hayward
ATTORNEY C. E. LARRABEE.
DUPLEX COUNTER.
APPLICATION FILED JUNE 17, 1916.
1,263,571.
Patented Apr. 23, 1918.
5 SHEETS—SHEET 4.
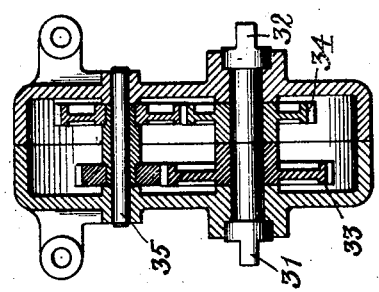
Fig. 8.
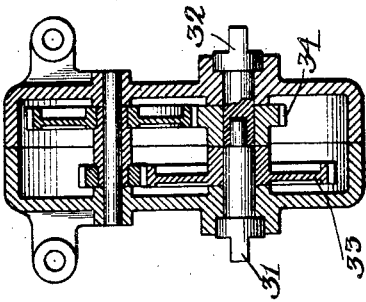
Fig. 10.
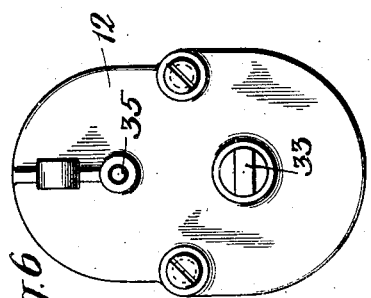
Fig. 7.
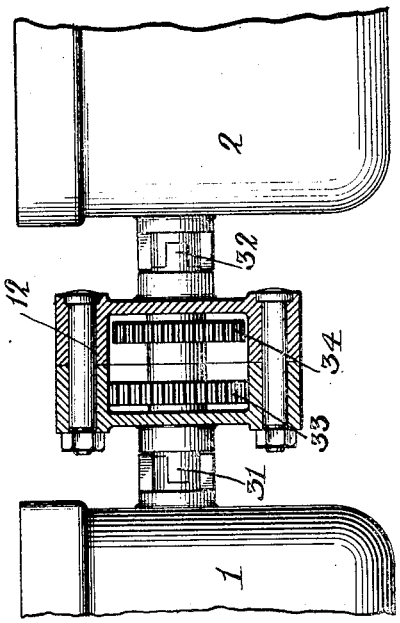
Fig. 9.
Fig. 6.
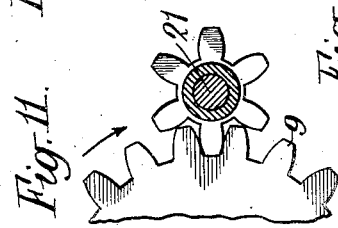
Fig. 11.
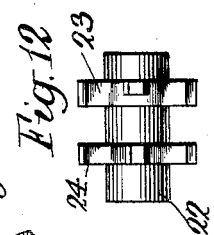
Fig. 12.
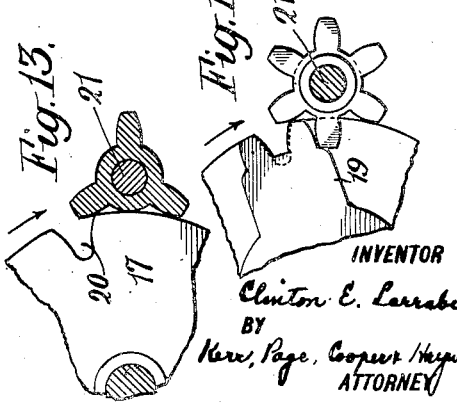
Fig. 13. Fig. 14.
INVENTOR
Clinton E. Larrabee
BY
Kerr, Page, Cooper & Hayward
ATTORNEY

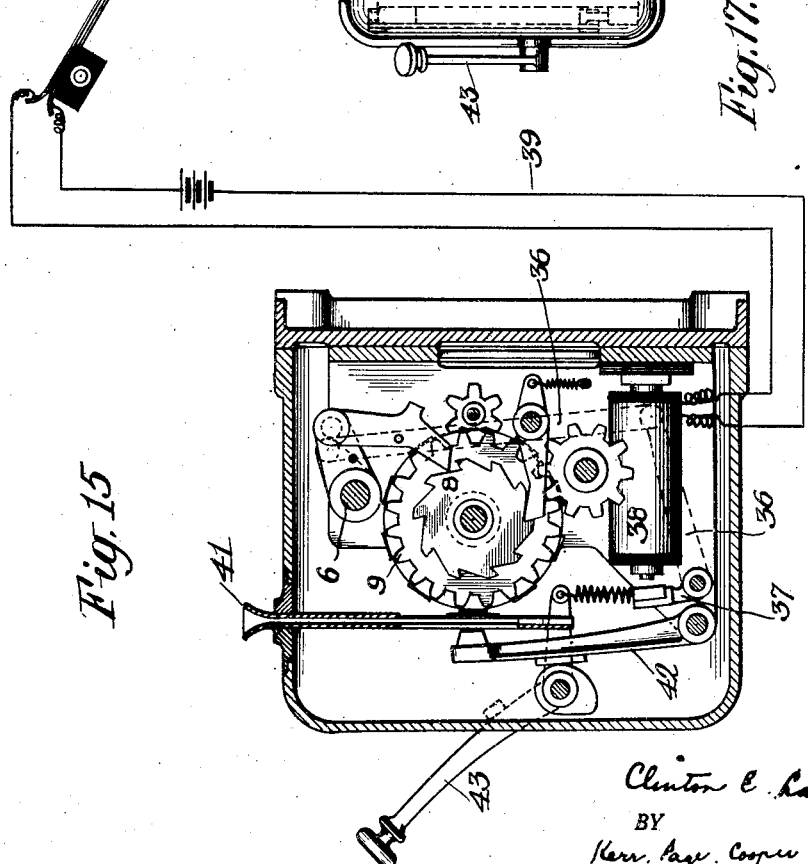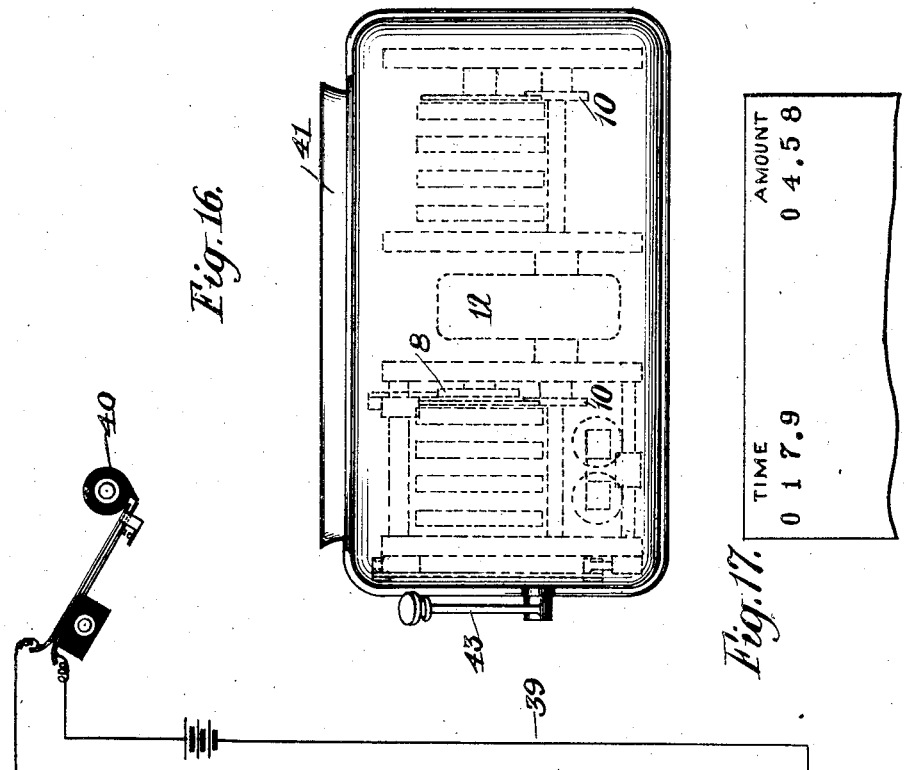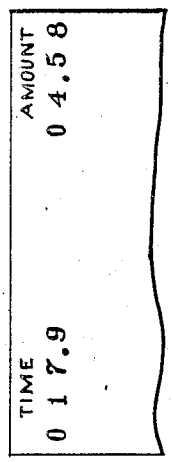

UNITED STATES PATENT OFFICE.

CLINTON E. LARRABEE, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK.

DUPLEX COUNTER.

1,263,571.  Specification of Letters Patent.  Patented Apr. 23, 1918.

Application filed June 17, 1916. Serial No. 104,154.

*To all whom it may concern:*

Be it known that I, CLINTON E. LARRABEE, residing at Binghamton, county of Broome, and State of New York, have invented certain new and useful Improvements in Duplex Counters, of which the following is a full, clear, and exact description.

In extensive manufacturing enterprises, modern practice requires that records of the operation of each machine, and of the money value of the work performed by such machine be kept, or what would be the substantial equivalent of such records, for example, the number of the operations of a machine, and the amount due the operative for attending it and the like. In other words dual but correlative records are desirable, which if made by mechanical devices will require two essentially distinct types of apparatus for producing them.

To provide for the more economical and effective attainment of such results I have devised a form of counter, which is, in effect, a dual instrument but of very simple construction and mode of operation, which is adapted for attachment to a great variety of machines and which will not only produce and constantly exhibit the desired registrations, but permit cards to be printed or punched to record their condition at any time. In this device resides the invention which forms the subject of my present application for Letters Patent.

To convey a clear understanding of the nature and purposes of the invention, I will assume any type of machine the operations of which may be registered by a simple form of counter which registers the number of cycles of such machine corresponding to the production of articles made thereby. Such a counter is attached to the machine and in conjunction with it a second counter is employed geared to the main operating shaft or element of the same by means which impart to said second counter a movement relatively faster or slower than the first in any desired ratio so as to produce a record different from but corresponding to that of the first counter. As above stated the first counter will register the number, say, of pieces made by the machine, while the second will register the money value of such pieces, or the amount with which the operative is to be credited for making them or other and similar data.

Such a device requires certain parts and appurtenances of peculiar construction to adapt it for practical use and operation, and these will be more fully described by reference to the drawings hereto annexed and in which:—

Fig. 2 is a detailed view of the interior mechanism in elevation, the casing being shown in section.

Fig. 3 is a horizontal sectional view on the line 3—3 of Fig. 4.

Fig. 4 is a vertical section on line 4—4 of Fig. 2, showing in dotted lines the mechanism for punching cards to record the condition of the counters.

Fig. 5 is a vertical section on line 5—5 of Fig. 2.

Fig. 6 is a side view of the gear casing between the two counters.

Fig. 7 is a sectional view of such casing exhibiting the gears therein.

Fig. 8 is a cross-sectional view of the same parts.

Fig. 9 is a horizontal sectional view of the same parts showing in detail the method of attachment to the counter casings.

Fig. 10 is a view corresponding to Fig. 8, of a modified form of gear connection.

Figs. 11, 12, 13 and 14 are detailed views of devices used in the counters for transmitting movement from one registering disk to another.

Fig. 15 is a central vertical section of a counter adapted to print on a card a record of its condition and driven electrically.

Fig. 16, is a front elevation of the same, and

Fig. 17 is a view of a printed card.

Figure 1:
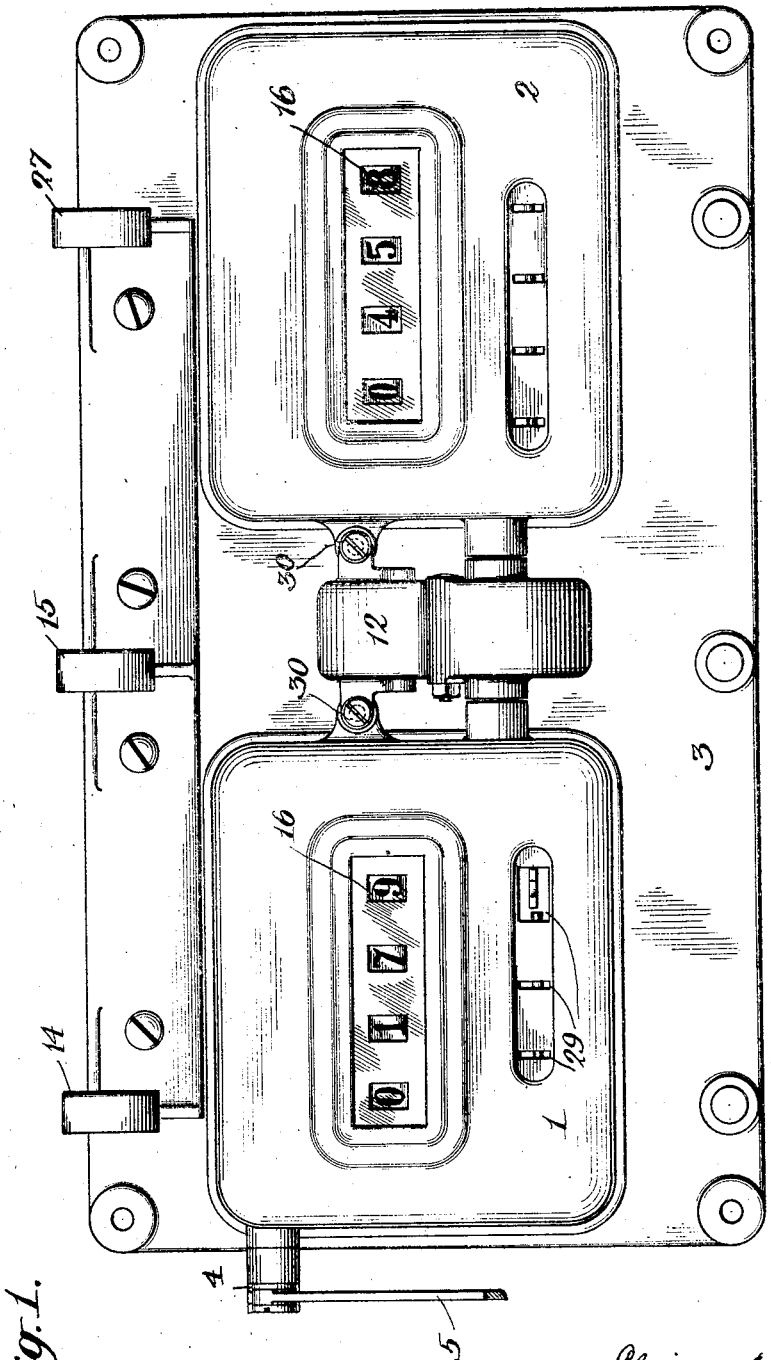
Figure 1 is a front elevation of the complete device organized and adapted for attachment to any proper machine.

The counters are contained in casings 1 and 2, having display openings to exhibit the index wheels. The instruments are desirably mounted on a plate 3, which may be attached in any convenient way to a given machine, and for indicating the means by which the counter is operated. I have shown an oscillating crank arm 4 to which a rod 5 from some movable part of the machine is connected. The movements of the arm 4 are transmitted to a shaft 6, (Fig. 4) which carries a pawl 7, engaging the teeth of a ratchet wheel 8.

This wheel 8 is secured to a twenty tooth gear wheel 9, that engages with a pinion 10, on the shaft 11, that extends entirely through the first counter, and is connected by suitable gears in an intermediate gear box 12, with a shaft 13, which is the main operating shaft of the second counter.

On the extreme end of the shaft 13, in the second counter is also a ten toothed ratchet wheel 8 which has no function, unless the second counter is used in place of the first, in which event a pawl similar to the pawl 7, or some equivalent device is used to operate it. The said shaft 13, however, carries a gear 10 corresponding to that in the first counter and by this means imparts motion to the units wheel 9 of the second counter corresponding to that of the first.

This means is the same in each counter. The ratchet wheel 8 and gear 9, are secured to a units index dial 16, and for each movement of the power wheel of one tooth and of the latter of two, this dial is turned through one figure or character space. Then in order to move the dial of the next higher order of units one space for every complete revolution of the dial below it, I employ the means more particularly illustrated in Figs. 5 and 11 to 14.

On the side of each dial opposite to that to which the gear wheels 9 are attached is a disk 17, and a cam 18, both rigid with the dial. Attached to the disk 17, there is a two-toothed sector 19, the space between the teeth of which overlies a similar and somewhat deeper indentation 20 in the disk 17. Alongside the disk on a transverse shaft 21 are a series of loose sleeves 22, having two gears side by side. The left hand gear, shown in Fig. 12, is double, having three teeth on one side and six on the other, the former being shown in Fig. 13, the latter in Fig. 14, and the disk with its two toothed sector is so placed relatively to this double gear that the sector is on the plane of the six toothed portion while the disk itself is in the plane of the three toothed portion.

From this it follows that the gear sleeves 22 are normally locked against rotation by the engagement of the three toothed portions of the gears with the adjacent periphery of the disk, but when, by the rotation of the disk, the two toothed sectors are brought into engagement with the six toothed portion of gears 23, the said gears are moved because at that time a tooth on the three toothed portion falls into the indentation in the periphery of the disk.

The sleeve 22 is thereby turned and as it carries a gear 24 that engages with a gear 9 on the dial of the next higher order of units the said dial is turned one space for every revolution of the dial next below it in order.

I have described a specific construction of counter which in itself is not a part of my invention, but which may be very greatly varied in construction, design and operation. It should, however, have either the cams 18, or some equivalent means the position of which will vary with and correspond to the position of the index dials, in order to afford a ready means for obtaining from each counter a punched or printed record of its exact condition at any time. In the present case I employ with each cam 18, a pivoted lever 25, having a pin 26, projecting sidewise from its lower end and adapted to be forced toward the cams, so as to have a movement of greater or less extent according to the position of said cams. Then when a record of the counters is to be taken any proper or known form of card punching mechanism is suspended from hooks 14 and 15, or 15 and 27, (Fig. 1) and operated to force fingers 28, as indicated in dotted lines in Fig. 4 through openings 29, in the front of the counter casings where they engage with the pins 26, and force the levers 25, against the cams. The extent of the movements of the fingers 28 thus permitted determines the position or the character of the holes punched in the card, and these latter will be an exact and true representation of the condition of the counters at any time when the record was taken.

The gear box 12, between the two counters is a casing that is adapted to be secured by screws 30 to the two counter casings. It contains a two part shaft 31, 32 with ends adapted to engage with the ends of the counter shafts 11 and 13 as shown in Fig. 9, and each part of said shaft carries a gear wheel 33, or 34. These may be of widely differing diameters according to the relative speeds required in the two counters. In Fig. 8, for example, the gear 33 is not very much larger than gear 34, and the intermediate gears on a counter spindle 35, by which the movement of 33 is transmitted to 34, bear substantially similar relations with the result that the main shaft of the right hand counter is revolved at say at twice the speed of the shaft 11.

In Fig. 9, on the other hand the relations of the gears is adjusted so as to result in a different speed ratio, say six to one, and similarly the relations may be varied to any other desired extent. The gear box is also constructed and designed to be reversed, that is to say, it may be turned to connect the shafts 11 and 13 so that the latter will turn slower than the other and in this and other well understood ways any relative speed of operation between the two counters may be provided for.

As an illustration of the possible modifications of construction of the counters I have shown Figs. 15 to 17. In this case the shaft 6 which operates the pawl 7, is oscillated by connecting plates or bars 36 with the armature 37 of an electro-magnet 38 arranged in the counter casing. The magnet is operated by an electric circuit 39, controlled by a rotary switch 40 moved by any suitable source of power that may be desired, such as a clock. In such case the counter is operated say ten times an hour or any other fraction of time and the record which it displays or which may be taken from it will indicate a given elapsed time.

The second counter under such circumstances will be arranged to show the money value of the operator's service for such time or any other equivalent and corresponding data.

To facilitate the taking of records from such a counter, I use a wide card slot 41 in a single counter casing and a card of sufficient width to include both counters, I also provide printing levers 42 operated by a handle 43 to force the card against type characters on the index dials and print on it the figures which are presented at their printing positions.

A device of the kind hereinbefore described has a wide field of usefulness in many manufacturing enterprises in which computations and tabulations of practical results, costs and the like are essential in the conduct of the business. It saves both mechanism and time in securing its intended results, and can be made in great numbers at a very small cost.

What I claim is:—

1. A recording and computing machine comprising in combination two counting mechanisms in fixed relation and adapted for attachment to and operation by a given machine, one adapted to be operated by or in accordance with the operation of such machine, an independent detachable connecting device, connecting gears of predetermined ratios therein, adapted for applications to and use with the counters and when attached thereto to connect by the said gears the driving or operating means of both counters, whereby the movement imparted by one to the other will vary according to the character of the intermediate gears.

2. A duplex counting or recording mechanism, comprising in combination, two counters mounted on a rigid base and adapted for attachment to and operation by a given machine, the one operated by or in accordance with the operations of said machine, the other operated by the first, a spindle in the first counter having a rate of movement corresponding to the operation of the machine and counter, a spindle in the second counter by which it is operated, an independent detachable connection box adapted for attachment to and use with the counters and gears therein of predetermined ratios which engage with and connect the two spindles when the box is attached.

3. A duplex counting and recording mechanism, comprising in combination two counters in fixed relation adapted for attachment to and operation by a given machine and one adapted to be operated by direct connection with said machine, an independent attachable connection box, gears therein of predetermined ratio adapted when said box is attached to the two counters to connect the operating members of the same, means operated by the mechanism of the counters which indicate by their positions the state of the counting mechanism, and detachable means for making records corresponding to the positions of the said indicating means.

In testimony whereof I affix my signature in the presence of two subscribing witnesses.

CLINTON E. LARRABEE.

Witnesses:
L. F. GIBLIN,
ROBERT BURNS.